(12) United States Patent
Iwamoto

(10) Patent No.: US 12,078,131 B2
(45) Date of Patent: Sep. 3, 2024

(54) CANISTER

(71) Applicant: FUTABA INDUSTRIAL CO., LTD., Okazaki (JP)

(72) Inventor: Koji Iwamoto, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 165 days.

(21) Appl. No.: 17/978,631

(22) Filed: Nov. 1, 2022

(65) Prior Publication Data

US 2023/0151782 A1    May 18, 2023

(30) Foreign Application Priority Data

Nov. 12, 2021  (JP) .................................. 2021-185059

(51) Int. Cl.
*F02M 25/08* (2006.01)
*B01D 53/04* (2006.01)

(52) U.S. Cl.
CPC ..... *F02M 25/0854* (2013.01); *B01D 53/0423* (2013.01); *B01D 2253/102* (2013.01)

(58) Field of Classification Search
CPC ............. F02M 25/0854; F02M 25/089; B01D 53/0423; B01D 2253/102; B01D 2259/4516; B01D 2259/4566; B01D 53/0407; B01D 53/0415; B01D 53/0446; B60K 15/03504; B60K 2015/03514
See application file for complete search history.

(56) References Cited

U.S. PATENT DOCUMENTS

| | | | |
|---|---|---|---|
| 2009/0013973 A1* | 1/2009 | Yamasaki | F02M 25/0854 123/519 |
| 2009/0320685 A1 | 12/2009 | Yoshida et al. | |
| 2021/0088006 A1* | 3/2021 | Yoshida | F02M 25/089 |

FOREIGN PATENT DOCUMENTS

| | | |
|---|---|---|
| JP | 2006214403 A | 8/2006 |
| JP | 2009019572 A | 1/2009 |
| JP | 2010007573 A | 1/2010 |
| JP | 2018071509 A | 5/2018 |
| JP | 2021050656 A | 4/2021 |

OTHER PUBLICATIONS

Notice of Reasons for Refusal for Japanese Patent Application No. 2021-185059 mailed Sep. 26, 2023.
Notice of Reasons for Refusal for Japanese Patent Application No. 2021185059, mailed Sep. 26, 2023, 8 pages.

* cited by examiner

*Primary Examiner* — Xiao En Mo
(74) *Attorney, Agent, or Firm* — Withrow + Terranova, PLLC; Vincent K. Gustafson

(57) ABSTRACT

A canister that adsorbs and desorbs evaporative fuel generated in a fuel tank of a vehicle includes an adsorbent and a tubular body. A contact surface that is at least a partial area of an inner wall surface of the tubular body in a length direction of a central axis is brought into contact with a side surface of the inserted adsorbent to suppress movement of the adsorbent in a direction orthogonal to the central axis. The tubular body has an inclined surface in which the inner wall surface is inclined in a direction approaching the central axis of the tubular body in at least a partial area of an area from a starting point to the contact surface, the starting point being an opening end of an opening into which the adsorbent can be inserted.

7 Claims, 9 Drawing Sheets

CANISTER

CROSS-REFERENCE TO RELATED APPLICATIONS

The present application claims priority based on Japanese Patent Application No. 2021-185059 filed to Japanese Patent Office on Nov. 12, 2021, and the content of Japanese Patent Application No. 2021-185059 is incorporated by reference in its entirety.

BACKGROUND

The present disclosure relates to a canister.

A canister that prevents release of evaporated fuel to the atmosphere is mounted on a fuel tank of a vehicle. The canister adsorbs evaporative fuel to an adsorbent such as activated carbon, desorbs the fuel from the adsorbent by sucked air, performs purging, and supplies the evaporative fuel to the engine. Japanese Patent Application Laid-Open No. 2021-50656 (hereinafter, Patent Document 1) discloses a canister that accommodates a honeycomb adsorbent. Specifically, in the canister described in Patent Document 1, a round tubular housing accommodates a round columnar honeycomb adsorbent.

SUMMARY

However, in the canister described in Patent Document 1, when the honeycomb adsorbent is inserted into the housing, there is a possibility that the honeycomb adsorbent comes into contact with an opening end of an opening of the housing and is damaged.

One aspect of the present disclosure preferably provides a technique capable of appropriately holding an adsorbent while suppressing breakage of the adsorbent when the adsorbent is inserted into a canister.

An aspect of the present disclosure is a canister that adsorbs and desorbs evaporative fuel generated in a fuel tank of a vehicle. The canister includes an adsorbent and a tubular body. The adsorbent is formed into one mass that adsorbs the evaporative fuel. The tubular body has a tubular shape and holds the adsorbent in a state where the adsorbent is inserted therein. A contact surface that is at least a partial area of an inner wall surface of the tubular body in a length direction of a central axis is brought into contact with a side surface of the inserted adsorbent to suppress movement of the adsorbent in a direction orthogonal to the central axis. The tubular body has an inclined surface in which the inner wall surface is inclined in a direction approaching the central axis of the tubular body in at least a partial area of an area from a starting point to the contact surface, the starting point being an opening end of an opening into which the adsorbent can be inserted.

According to such a configuration, in the tubular body, the opening end of the opening into which the adsorbent can be inserted is wider than a distal end on an insertion side of the adsorbent. Therefore, when the adsorbent is inserted, the adsorbent can be prevented from coming into contact with the opening end of the opening. Therefore, it is possible to suppress breakage of the adsorbent when the adsorbent is inserted. In addition, since the movement of the adsorbent is suppressed by the contact surface, the canister can appropriately hold the adsorbent.

In the canister described above, the inclined surface may be formed in at least a partial area of the contact surface, and form a cross-sectional area in the direction orthogonal to the central axis, the cross-sectional area decreasing from an opening side of the contact surface toward an opposite side of the opening in the length direction of the central axis of the contact surface. According to such a configuration, a portion on the opening side of the contact surface is wider than the distal end on the insertion side of the adsorbent. Therefore, when the adsorbent is inserted, the adsorbent can be prevented from coming into contact with the portion on the opening side of the contact surface. Therefore, it is possible to suppress breakage of the adsorbent when the adsorbent is inserted.

In the canister described above, the inclined surface may be formed in at least a partial area between the opening and an end portion on the opening side of the contact surface, and form a cross-sectional area in the direction orthogonal to the central axis, the cross-sectional area decreasing from the opening side toward the end portion on the opening side of the contact surface. According to such a configuration, the opening is wider than the distal end on the insertion side of the adsorbent. Therefore, when the adsorbent is inserted, the adsorbent can be prevented from coming into contact with the opening. Therefore, it is possible to suppress breakage of the adsorbent when the adsorbent is inserted.

The canister described above may further include a filter that closes the opening. A welded portion where a wall surface forming the opening and the filter are welded may be provided. According to such a configuration, the movement of the adsorbent in the direction of the filter is suppressed. Therefore, the removal of the adsorbent from the tubular body can be suppressed.

The canister described above may further include an outer shell member that houses the tubular body. According to such a configuration, damage to the tubular body can be suppressed by the outer shell member.

In the canister described above, the outer shell member may be directly or indirectly brought into contact with the adsorbent to suppress the removal of the adsorbent in the direction opposite to the direction in which the adsorbent is inserted. According to such a configuration, the removal of the adsorbent from the tubular body can be suppressed.

In the canister described above, the adsorbent may be an elastically deformable mass of activated carbon. According to such a configuration, it is easy to prevent generation of a gap between the tubular body and the adsorbent.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

1. First Embodiment

[1-1. Configuration]

Figure 1:
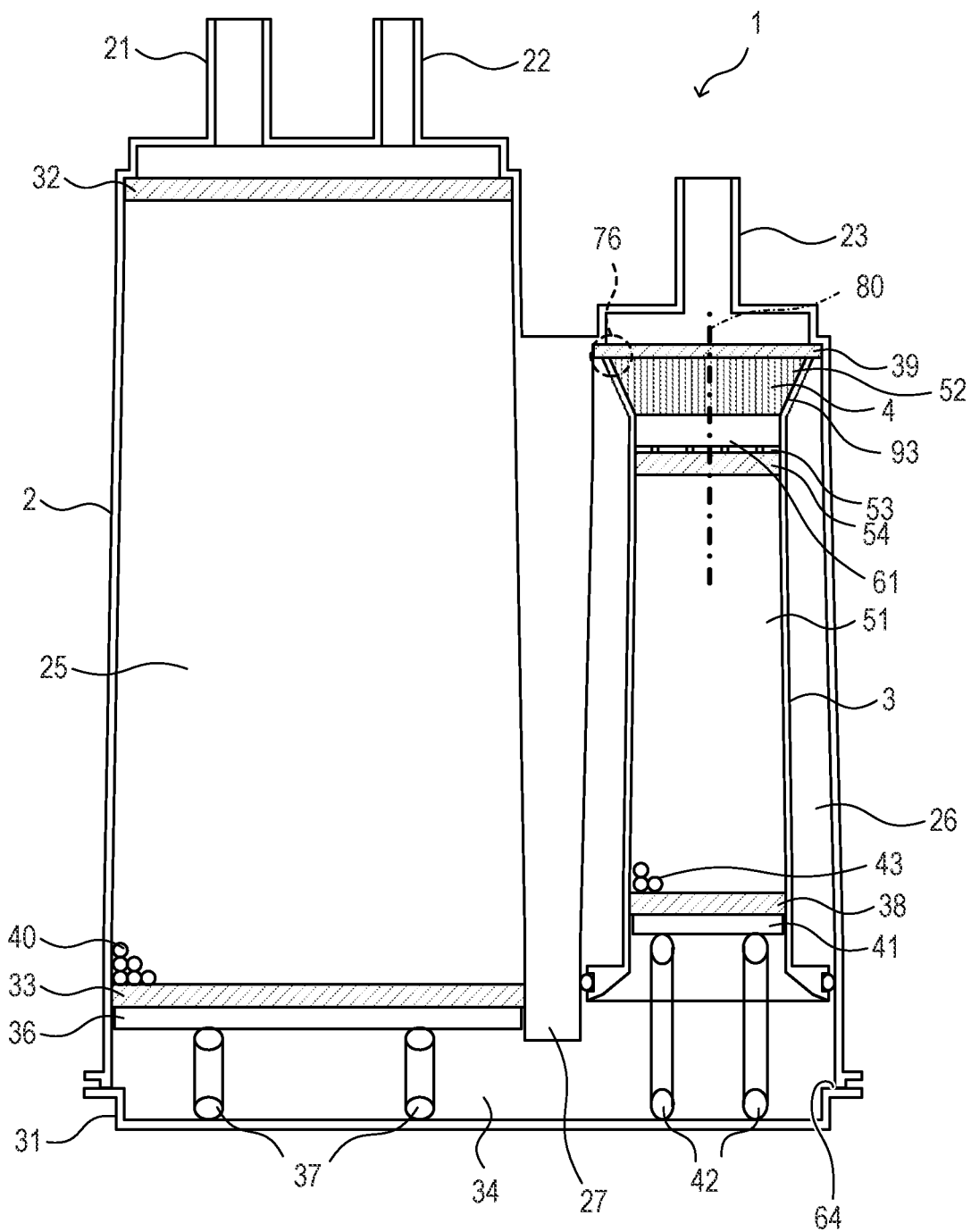
FIG. 1 is a cross-sectional view of a canister according to a first embodiment as viewed from the side.

A canister 1 illustrated in FIG. 1 adsorbs and desorbs evaporative fuel generated in a fuel tank (not illustrated) of a vehicle. The canister 1 includes an outer case 2, an inner case 3, and an adsorbent 4.

The outer case 2 is a case having an internal space. The outer case 2 is a synthetic resin case. Note that the material of the outer case 2 is not limited thereto.

The outer case 2 includes a charge port 21, a purge port 22, and an atmosphere port 23. These ports are arranged on the same side of the case so as to face in the same direction. Hereinafter, the side of the outer case 2 on which the charge port 21, the purge port 22, and the atmosphere port 23 are provided will be referred to as a port side. The outer case 2 has an opening 64 on the side opposite to the port side. The opening 64 is closed by a lid member 31. Hereinafter, the side opposite to the port side (in other words, the side on which the lid member 31 is provided) is referred to as a lid side.

The charge port 21 is connected to the fuel tank of the vehicle by piping. The charge port 21 is configured to take evaporative fuel generated in the fuel tank into the canister 1.

The purge port 22 is connected to an intake pipe (not illustrated) of an engine of the vehicle via a purge valve. The purge port 22 is configured to discharge evaporative fuel in the canister 1 from the canister 1 and supply the evaporative fuel to the engine.

The atmosphere port 23 is connected to a fuel filler port (not illustrated) of the vehicle via piping and is opened to the atmosphere. The atmosphere port 23 discharges the gas from which the evaporative fuel has been removed into the atmosphere. The atmosphere port 23 takes in external air (i.e., purge air) to desorb (i.e., purge) the evaporative fuel adsorbed by the canister 1.

The internal space of the outer case 2 is partitioned into a first chamber 25 and a second chamber 26 by a partition member 27.

As an example, the first chamber 25 has a substantially rectangular parallelepiped shape or a round columnar shape. The first chamber 25 has an end portion on the port side connected to the charge port 21 and the purge port 22. A filter 32 is disposed at the end portion on the port side of the first chamber 25. A filter 33 is disposed at an end portion on the lid side of the first chamber 25. An adsorbent 40 is disposed between the filter 32 and the filter 33. The adsorbent 40 is, for example, an aggregate of a plurality of pellets. The pellets are granular activated carbon. The pellets are produced by kneading powdery activated carbon together with a binder and molding the kneaded product into a predetermined shape. In the first chamber 25, for example, an adsorbent other than pellets such as powdery activated carbon may be disposed.

The end portion on the lid side of the first chamber 25 is connected to a communication path 34. The communication path 34 extends along the lid member 31 and connects the first chamber 25 and the second chamber 26. A perforated plate 36 having permeability for transmitting fuel vapor and purge air is disposed between the filter 33 on the lid side of the first chamber 25 and the communication path 34. Coil springs 37 are disposed between the perforated plate 36 and the lid member 31. The coil springs 37 press the perforated plate 36 toward the port side. Inside the canister 1, a fluid can travel back and forth between the first chamber 25 and the second chamber 26 via the communication path 34.

The second chamber 26 has an elongated shape extending from the communication path 34 to the atmosphere port 23. As an example, the second chamber 26 has a substantially rectangular parallelepiped shape or a round columnar shape. The second chamber 26 has an end portion on the port side connected to the atmosphere port 23. A filter 38 is disposed at an end portion on the lid side of the second chamber 26. A filter 39 is disposed at an end portion on the port side of the second chamber 26. The inner case 3 is disposed between the filter 39 and the lid member 31 in the second chamber 26. A welded portion 76 is formed at an end portion on the port side of the inner case 3. At the welded portion 76, the filter 39 is fixed to the end portion on the port side of the inner case 3 by ultrasonic welding, for example.

A perforated plate 41 having permeability for transmitting fuel vapor and purge air is disposed between the filter 38 on the lid side of the second chamber 26 and the communication path 34. Coil springs 42 are disposed between the perforated plate 41 and the lid member 31. The coil springs 42 press the perforated plate 41 toward the port side.

The inner case 3 is housed inside the outer case 2. The inner case 3 has a tubular shape. More specifically, the inner case 3 has a round tubular shape whose inner diameter is not constant over the entire length direction of a central axis 80. In the vicinity of an upper end of the inner case 3, the degree of change in the inner diameter toward the port side is larger than that of most of the other part, and the inner diameter of most of the other part gradually changes toward the lid side. The inner case 3 has a circular cross-sectional shape at any position in the length direction of the central axis 80. That is, the inner case 3 has a shape of a rotating body centered on the central axis 80. The inner case 3 is obtained by, for example, molding resin using a mold. The inner case 3 is partitioned by a partition plate 53 into a first adsorption chamber 51 and a second adsorption chamber 52 arranged in a flow direction of the fluid. The partition plate 53 is formed integrally with the inner case 3. The partition plate 53 has a vent hole. Therefore, inside the inner case 3, the fluid can travel back and forth between the first adsorption chamber 51 and the second adsorption chamber 52 via the partition plate 53. A filter 54 is disposed adjacent to the partition plate 53 on a surface of the partition plate 53 on the lid side. An adsorbent 43 is disposed between the filter 38 and the filter 54, that is, in the first adsorption chamber 51. Note that the adsorbent 43 may be of the same type as the adsorbent 40, or may be of a different type.

The second adsorption chamber 52 has an inclined surface 93 which is inclined in a direction in which an inner wall surface of the second adsorption chamber 52 approaches the central axis 80 of the inner case 3 from an opening end 96 of an opening 62 described later as a starting point. As a result, the second adsorption chamber 52 is configured to be partially tapered. More specifically, in the second adsorption chamber 52, the cross-sectional area in a direction orthogonal to the central axis 80 of the inner case 3 decreases within a certain area from an end portion on the port side of the second adsorption chamber 52 toward an end portion on the lid side of both ends of the second adsorption chamber 52. Here, the central axis 80 is a straight line passing through the center of gravity of a circular cross section in each portion of the inner case 3. The adsorbent 4 is disposed in the second adsorption chamber 52. The adsorbent 4 is an elastically deformable mass of activated carbon. As an example, the adsorbent 4 is one block-shaped agglomerate obtained by mixing activated carbon into sponge. The adsorbent 4 is configured to have substantially the same shape as the tapered portion of the second adsorption chamber 52. More specifically, the adsorbent 4 is formed in a truncated cone shape. The second adsorption chamber 52 holds the adsorbent 4 in a state where the adsorbent 4 is inserted therein.

Figure 2:
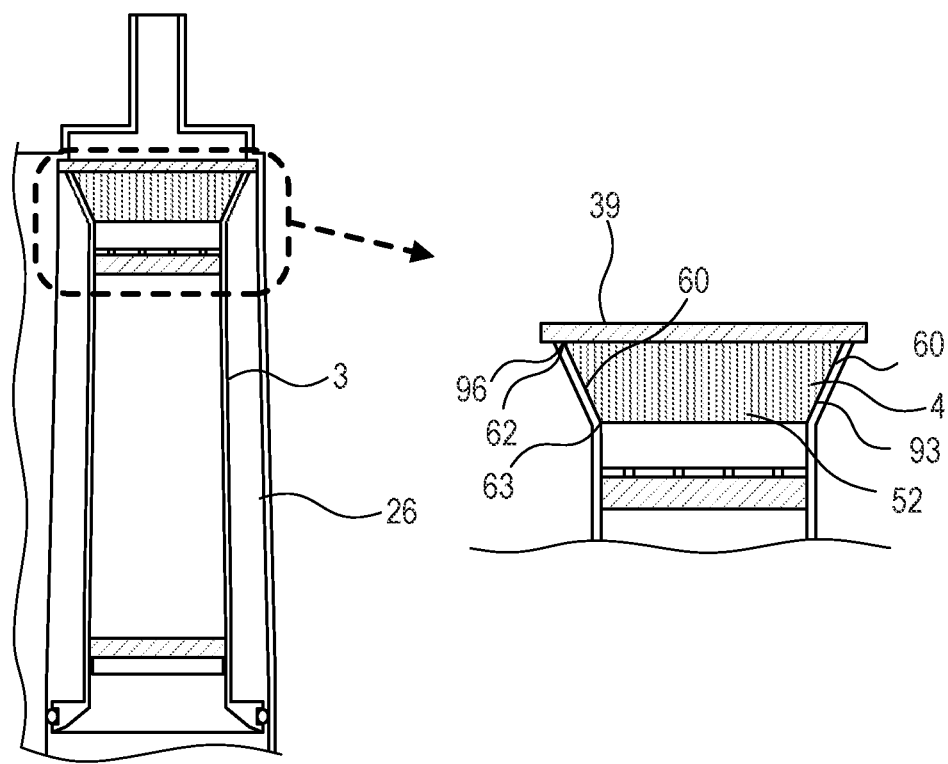
FIG. 2 is a cross-sectional view of a second chamber as viewed from the side and an enlarged view of a cross-sectional view of a second adsorption chamber as viewed from the side.

As illustrated in FIG. 2, an opening 62 into which the adsorbent 4 can be inserted is formed at the end portion on the port side of the second adsorption chamber 52. The inner diameter of the opening 62 is larger than the maximum dimension of the outer diameter of the adsorbent 4. An opening 63 is also formed at the end portion on the lid side of both ends of the second adsorption chamber 52. The second adsorption chamber 52 has a contact surface 60. The contact surface 60 is an inner wall surface of the second adsorption chamber 52, that is, an inner side surface. The contact surface 60 suppresses movement of the adsorbent 4 in the direction orthogonal to the central axis 80 of the inner case 3 by being brought into contact with an outer side surface of the inserted adsorbent 4. In addition, the outer case 2 is indirectly brought into contact with the adsorbent 4 to suppress removal of the adsorbent 4 in the direction opposite to a direction in which the adsorbent 4 is inserted. In the present embodiment, the contact surface 60 corresponds to an example of an inclined surface.

Returning to FIG. 1, a buffer space 61 is provided on the lid side of both ends of the second adsorption chamber 52. The adsorbent 4 and the adsorbent 43 are not disposed in the buffer space 61.

[1-2. Method of Assembling Inner Case to Outer Case]

Figure 3:
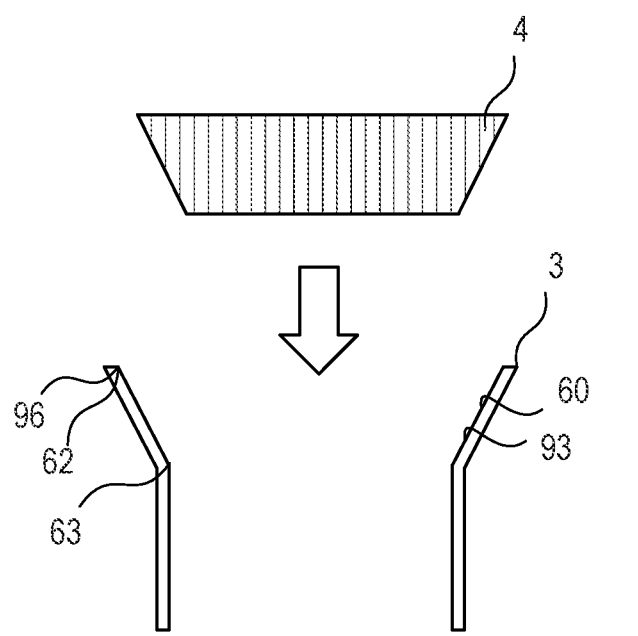
FIG. 3 is a schematic view when an adsorbent is inserted into an inner case.

As illustrated in FIG. 3, first, the adsorbent 4 is inserted into the second adsorption chamber 52 of the inner case 3 from the opening 62 on the port side of the inner case 3. The adsorbent 4 is inserted by being moved in parallel with respect to the state of being held in the second adsorption chamber 52.

Subsequently, the filter 39 is fixed to the end portion on the port side of the inner case 3 by ultrasonic welding.

Subsequently, the inner case 3 is inserted into the second chamber 26 of the outer case 2 from the opening 64 on the lid-side of the outer case 2. The inner case 3 is assembled to the outer case 2 in a state of a cartridge filled with the adsorbent 4. After the inner case 3 is assembled, the lid member 31 of the outer case 2 is assembled to the outer case 2.

[1-3. Effects]

According to the first embodiment described in detail above, the following effects can be obtained.

Figure 4:
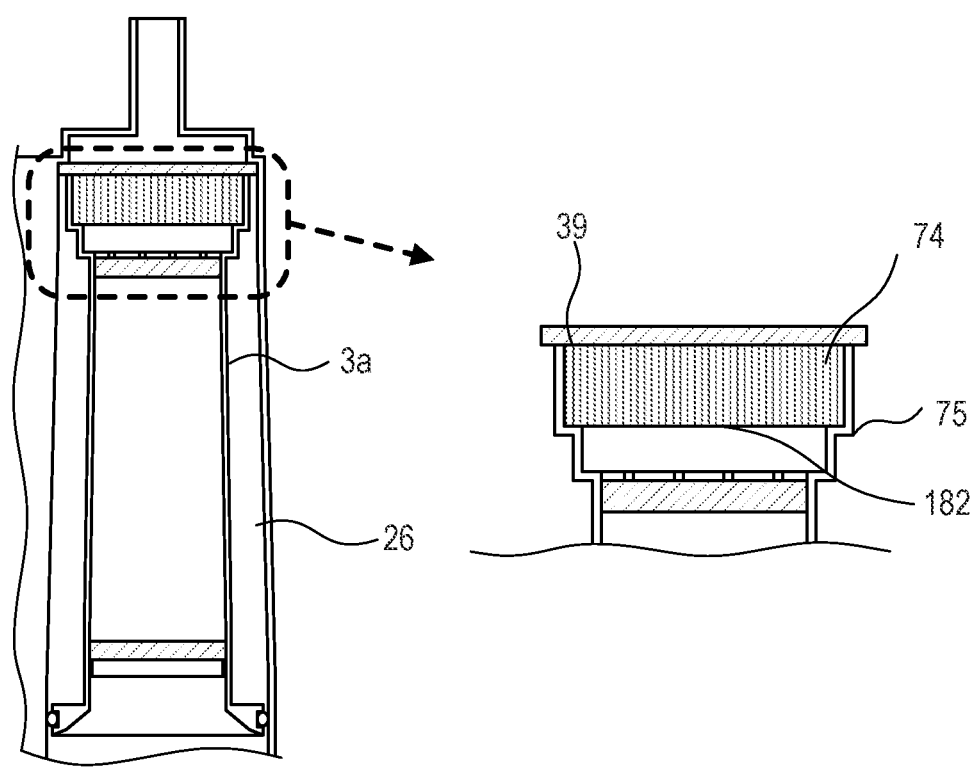
FIG. 4 is a cross-sectional view of the second chamber as viewed from the side and an enlarged view of the cross-sectional view of the second adsorption chamber as viewed from the side in a configuration in which cross-sectional areas in a direction orthogonal to a central axis of an inner case are substantially the same.

(1a) In the second adsorption chamber 52, the cross-sectional area in the direction orthogonal to the central axis 80 of the inner case 3 decreases from the end portion on the port side of the second adsorption chamber 52 toward the end portion on the lid side of both ends of the second adsorption chamber 52. Here, as illustrated in FIG. 4, an inner case 3a in which the diameter of an internal space (second adsorption chamber 182) does not change at an end on the port side is assumed. When an adsorbent material 74 having the same cross-sectional shape as the internal space is inserted into the inner case 3a, the adsorbent 74 may hit the opening end 96 of the opening on the port side of the inner case 3a, be scraped, and be damaged. However, according to a configuration of the first embodiment, the opening end 96 of the opening of the inner case 3a into which the adsorbent 4 can be inserted is wider than a distal end on an insertion side of the adsorbent 4. Therefore, when the adsorbent 4 is inserted, the adsorbent 4 can be prevented from coming into contact with the opening end 96 of the opening. Therefore, it is possible to suppress breakage of the adsorbent 4 when the adsorbent 4 is inserted.

In addition, as illustrated in FIG. 4, it is assumed that the second adsorption chamber 182 does not include the inclined surface 93 and includes a support portion 75 that supports the adsorbent 74 so as not to fall on the lid side of both ends of the second adsorption chamber 182. In this case, the flow of evaporative fuel may be deteriorated near the support portion 75. This is because, when the cross-sectional area of a flow path rapidly changes, a vortex flow is generated at a portion where the cross-sectional area rapidly changes, thereby inhibiting smooth flow. According to the configuration of the first embodiment, however, the evaporative fuel flows more smoothly along the inclined surface 93 as compared with the configuration including the support portion 75. Accordingly, the flow of evaporative fuel can be improved.

(1b) The filter 39 is fixed to the end portion on the port side of the inner case 3 by ultrasonic welding. According to such a configuration, the movement of the adsorbent 4 in the direction of the filter 39 is suppressed. Therefore, the removal of the adsorbent 4 from the inner case 3 can be suppressed. Together with an effect of (1d) described later, it is possible to further suppress the removal of the adsorbent 4 from the inner case 3.

(1c) In the canister 1, the inner case 3 is housed inside the outer case 2. According to such a configuration, damage to the inner case 3 can be suppressed by the outer case 2.

(1d) The outer case 2 is indirectly brought into contact with the adsorbent 4 to suppress the removal of the adsorbent 4 in the direction opposite to a direction in which the adsorbent 4 is inserted. According to such a configuration, the removal of the adsorbent 4 from the inner case 3 can be suppressed.

(1e) The adsorbent 4 is an elastically deformable mass of activated carbon. According to such a configuration, the adsorbent 4 can be disposed in the inner case 3 so as not to form a gap. Accordingly, leakage of evaporative fuel from between the inner case 3 and the adsorbent 4 can be suppressed.

[1-4. Correspondence]

In the present embodiment, the inner case 3 corresponds to an example of a tubular body, and the outer case 2 corresponds to an example of an outer shell member.

2. Second Embodiment

Figure 5:
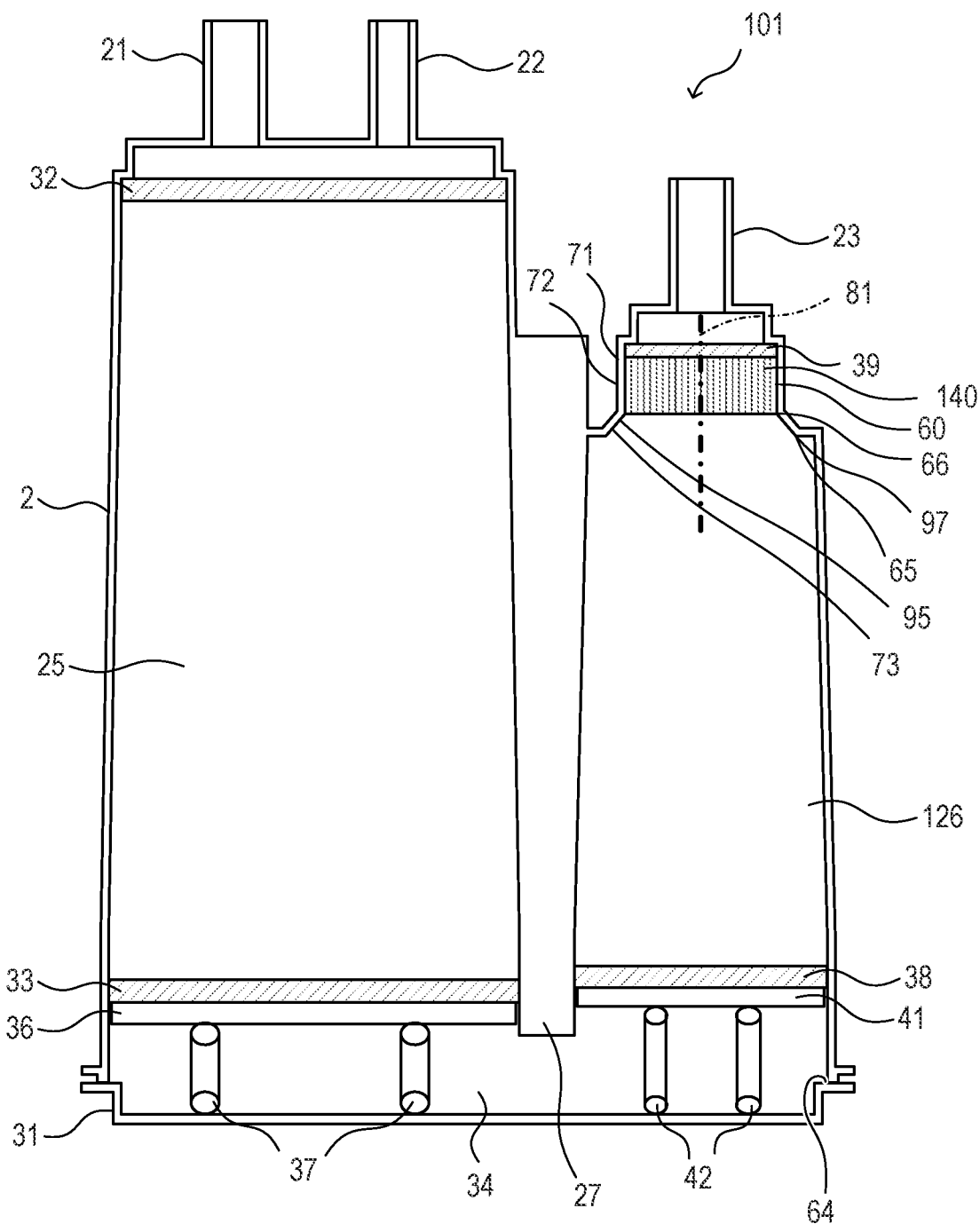
FIG. 5 is a cross-sectional view of a canister according to a second embodiment as viewed from the side.

A basic configuration of a second embodiment illustrated in FIG. 5 is similar to that of the first embodiment, and differences will be described below. Note that the same reference numerals as those in the first embodiment indicate the same configuration, and reference is made to the preceding description.

In the first embodiment, the canister 1 includes the inner case 3. On the other hand, in the second embodiment illustrated in FIG. 5, a canister 101 does not include the inner case 3. An adsorbent 140 is inserted from the opening 64 on the lid side of a second chamber 126 and is disposed inside a tube body 71 formed in the vicinity of the atmosphere port 23 in the canister 101. The tube body 71 includes a straight pipe portion 72 that is a straight pipe portion having a circular cross section, and a tapered portion 73 disposed closer to the lid side than the straight pipe portion 72. The lid side of the tapered portion 73 is an opening 65 into which the adsorbent 140 is inserted. An inner wall surface of the tapered portion 73 is an inclined surface 95 with which the cross-sectional area in a direction orthogonal to a central axis 81 of the straight pipe portion 72 decreases from the opening 65 side toward an end portion 66 on the opening 65 side of the contact surface 60. Here, the central axis 81 is a straight line passing through the center of gravity of a circular cross section in each portion of the straight pipe portion 72. The inclined surface 95 is formed between the opening 65 into which the adsorbent 140 is inserted and the end portion 66 on the opening 65 side of the contact surface 60. The inclined surface 95 is formed in a tapered shape.

[2-2. Effects]

According to the second embodiment described in detail above, the following effects can be obtained in addition to the effects of the first embodiment.

(2a) The inclined surface 95 forms the cross-sectional area in the direction orthogonal to the central axis 81 of the straight pipe portion 72, the cross-sectional area decreasing from the opening 65 side toward the end portion 66 on the opening 65 side of the contact surface 60. According to such a configuration, an opening end 97 of the opening 65 into which the adsorbent 140 can be inserted is wider than a distal end on an insertion side of the adsorbent 140. There-fore, when the adsorbent 140 is inserted, the adsorbent 140 can be prevented from coming into contact with the opening end 97 of the opening 65. Therefore, it is possible to suppress breakage of the adsorbent 140 when the adsorbent 140 is inserted.

[2-3. Correspondence]

In the present embodiment, the tube body 71 corresponds to an example of a tubular body.

3. Other Embodiments

Although the embodiments of the present disclosure have been described above, it is needless to say that the present disclosure is not limited to the above embodiments and can take various forms.

Figure 6:
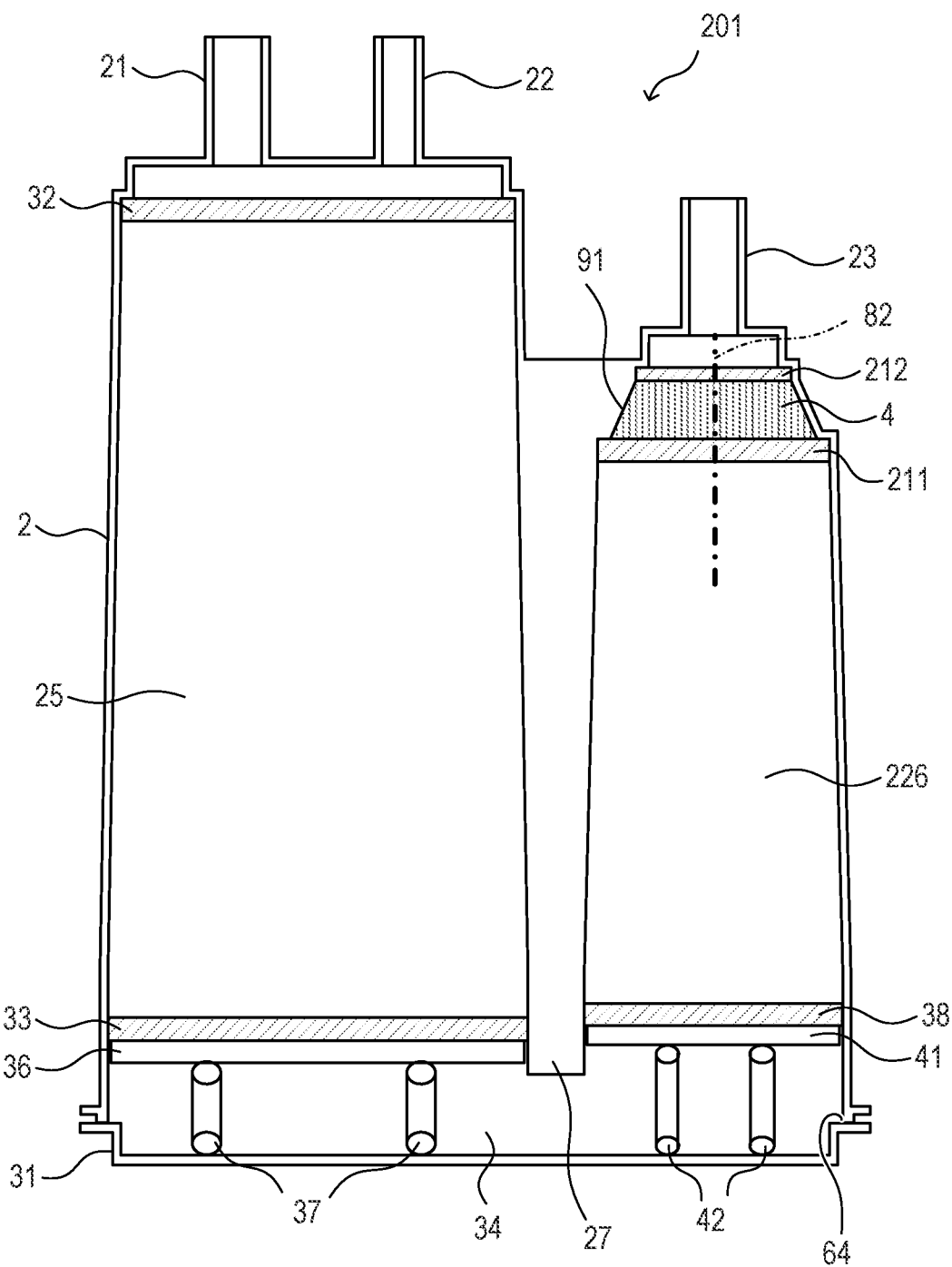
FIG. 6 is a cross-sectional view of a canister not including an inner case as viewed from the side.

(3a) In the second embodiment, the configuration including the straight pipe portion 72 and the tapered portion 73 has been exemplified. However, as illustrated in FIG. 6, in a canister 201, an end portion on the port side of a second chamber 226 may be formed in a tapered shape. In other words, a tube portion 91 defining a truncated cone shaped space in which the adsorbent 4 is disposed is formed at the end on the port side of the second chamber 226, and the cross-sectional area of the tube portion 91 in a plane orthogonal to a central axis 82 may decrease toward the end portion on the port side. Here, the central axis 82 is a central axis of the truncated cone shaped space formed by the tube portion 91, and passes through the center of gravity of a cross section of the space. The adsorbent 4 is sandwiched between a filter 211 and a filter 212. In the present modification, the tube portion 91 corresponds to an example of a tubular body.

Figure 7:
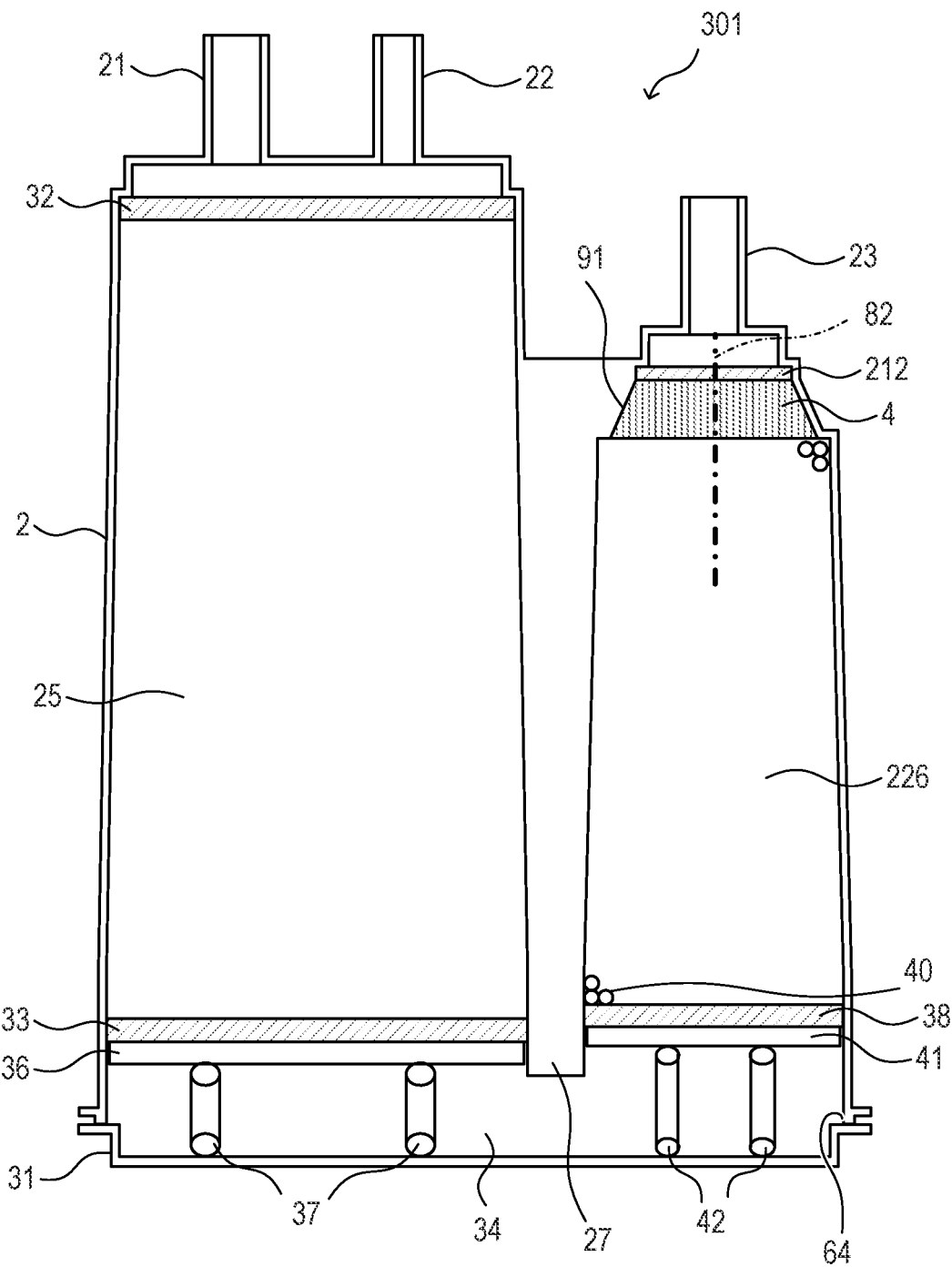
FIG. 7 is a cross-sectional view of a canister not including an inner case or a filter as viewed from the side.

As illustrated in FIG. 7, a canister 301 need not include the filter 211. Even in this case, the adsorbent 4 is supported by the adsorbent 43 laid in the second chamber 226 so as not to fall to the lid side.

Figure 8:
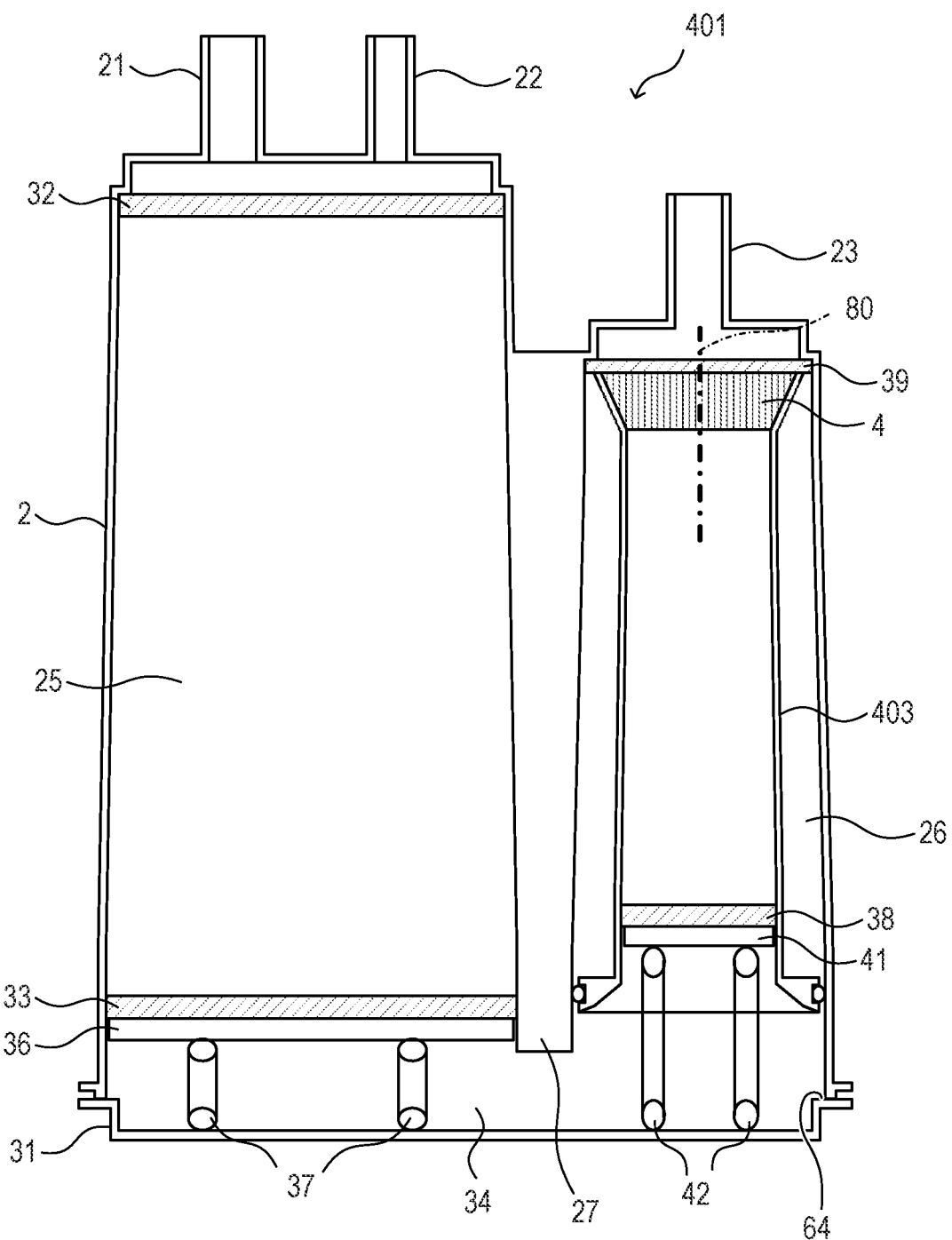
FIG. 8 is a cross-sectional view of a canister not including a filter as viewed from the side.

As illustrated in FIG. 8, when a canister 401 includes an inner case 403, a filter need not be provided on the lid side of the adsorbent 4.

Figure 9:
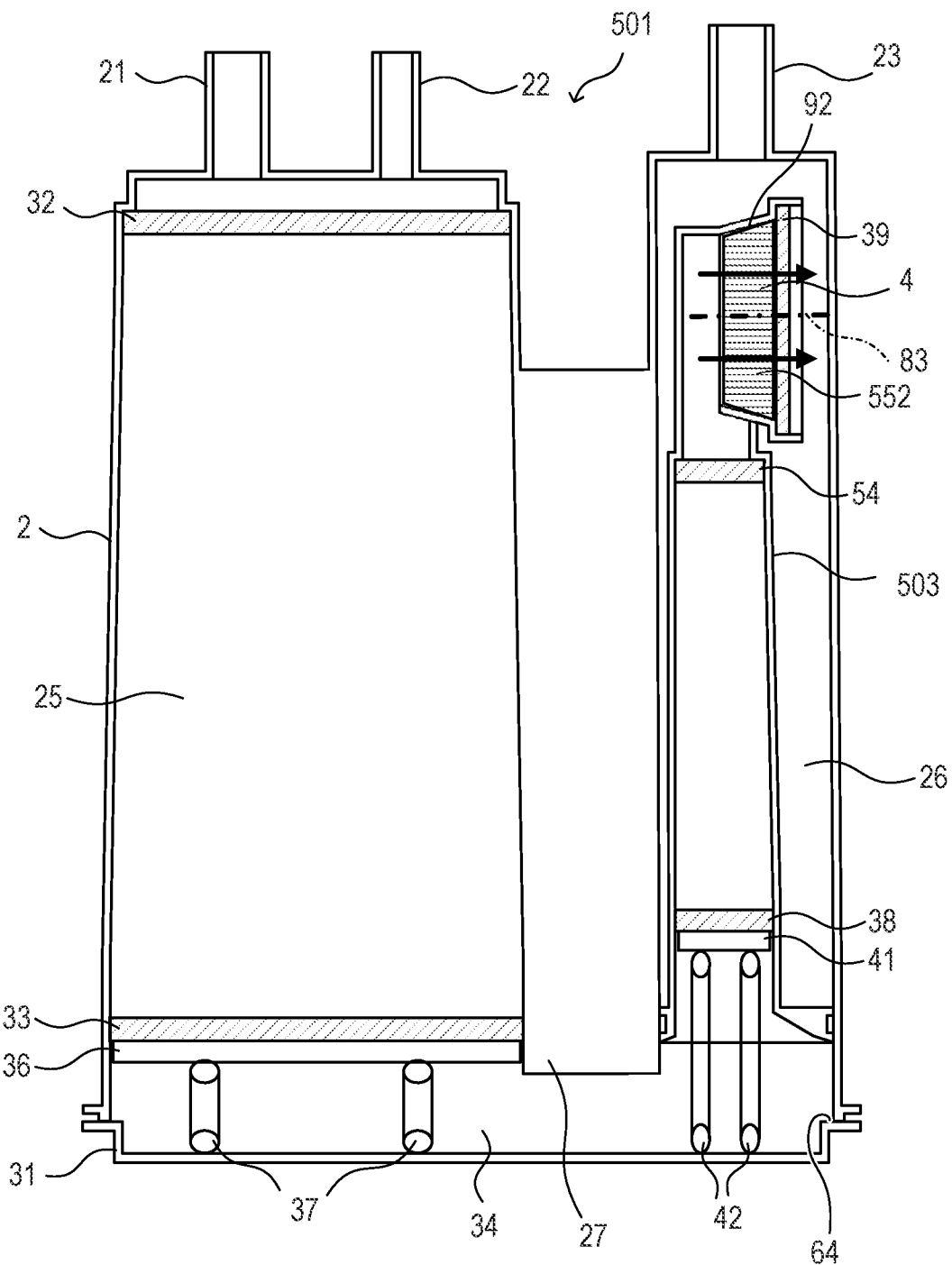
FIG. 9 is a cross-sectional view of a canister in which an opening of the second adsorption chamber faces the side as viewed from the side.

(3b) In the first embodiment, the configuration has been exemplified in which the opening of the second adsorption chamber 52 for inserting the adsorbent 4 is opened so that the fluid flows in parallel from the lid side to the port side. However, as illustrated in FIG. 9, an opening of a second adsorption chamber 552 for inserting the adsorbent 4 may be opened so that the fluid flows in an intersecting direction that is a direction perpendicular to the direction from the lid side toward the port side. In other words, at the end portion on the port side of the second chamber 26, a tubular portion 92 having a length in the above-described intersecting direction and defining a truncated cone shaped space in which the adsorbent 4 is disposed may be formed. Furthermore, the cross-sectional area of the tube portion 92 in a plane orthogonal to a central axis 83 may decrease from the opening toward the inside of the inner case 3 in the above-described intersecting direction. Here, the central axis 83 is a central axis of the truncated cone shaped space formed by the tube portion 92, and passes through the center of gravity of a cross section of the space. In the present modification, the tube portion 92 corresponds to an example of a tubular body.

Figure 10A:
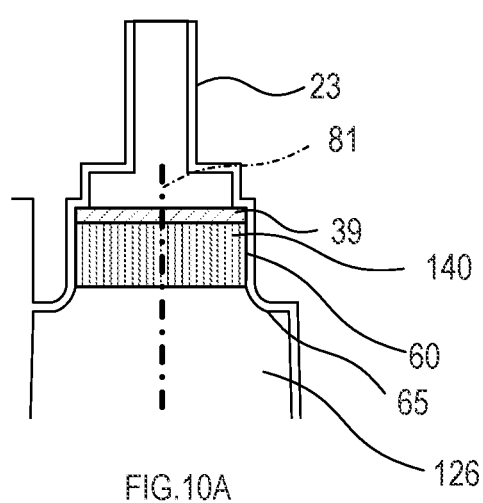
FIG. 10A is an enlarged view of a cross-sectional view of a canister according to a modification of the second embodiment as viewed from the side, and is a view of the canister configured such that a portion between an opening into which an adsorbent can be inserted and an end portion on an opening side of a contact surface protrudes toward an internal space of the second chamber.
Figure 10B:
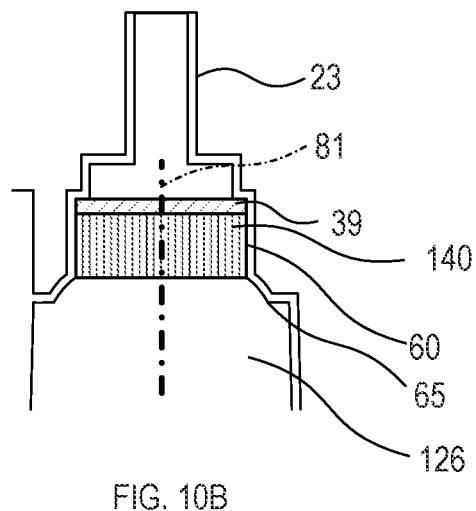
FIG. 10B is an enlarged view of a cross-sectional view of a canister according to a modification of the second embodiment as viewed from the side, and is a view of the canister configured such that the portion between the opening into which the adsorbent can be inserted and the end portion on the opening side of the contact surface protrudes toward the outside of the second chamber.

(3c) In the second embodiment, the inclined surface 95 configured in a tapered shape having a linear cross-sectional shape has been exemplified. However, the cross-sectional shape of the inclined surface need not be linear. For example, as illustrated in FIG. 10A, a portion between the opening 65 into which the adsorbent 140 can be inserted and the end portion on the opening 65 side of the contact surface 60 may be configured to protrude toward the internal space of the second chamber 126. For example, as illustrated in FIG. 10B, a portion between the opening 65 into which the adsorbent 140 can be inserted and the end portion on the opening 65 side of the contact surface 60 may be configured to protrude toward the outside of the second chamber 126.

Figure 11A:
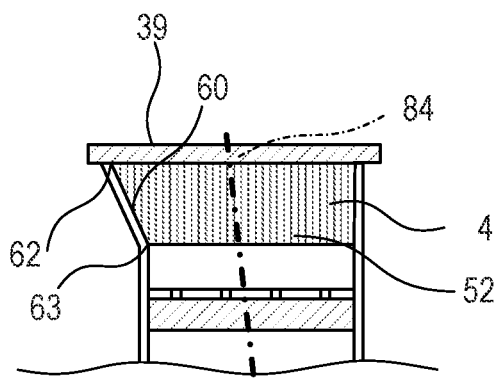
FIG. 11A is an enlarged view of a cross-sectional view of a canister according to a modification as viewed from the side, and is a view of the canister in which a central axis is inclined with respect to the length direction of the inner case.
Figure 11B:
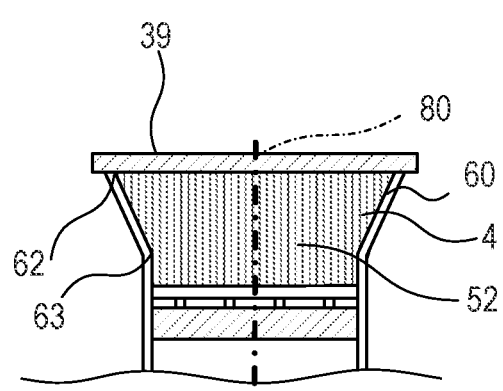
FIG. 11B is an enlarged view of a cross-sectional view of a canister according to a modification as viewed from the side, and is a view of the canister in which an inclined surface is formed in an area shorter than the contact surface in the length direction of the inner case.
Figure 11C:
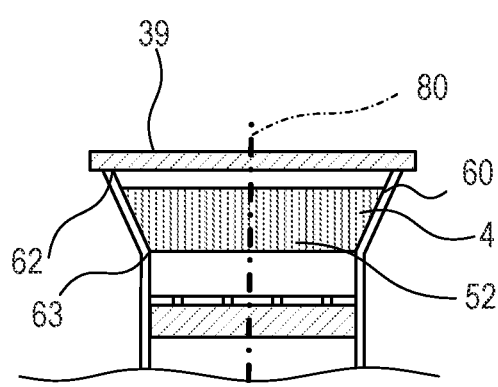
FIG. 11C is an enlarged view of a cross-sectional view of a canister according to a modification as viewed from the side, and is a view of the canister in which an inclined surface is formed in an area longer than the contact surface in the length direction of the inner case.

(3d) In the first embodiment, the configuration in which the inclined surface 93 is formed on the entire surface of the contact surface 60 has been exemplified. In the second embodiment, the configuration in which the inclined surface 95 is formed on the entire surface of the portion between the opening 65 into which the adsorbent 140 can be inserted and the end portion on the opening 65 side of the contact surface 60 has been exemplified. However, the area in which the inclined surface is formed is not limited thereto. The inclined surface only need be formed in at least a partial area of an area from a starting point to the contact surface, the starting point being the opening end of the opening into which the adsorbent can be inserted. The at least partial area of the area from the opening end to the contact surface refers to at least a partial area of the area including the entire region of the contact surface from the opening end. In other words, the at least partial area of the area from the opening end to the contact surface refers to at least a partial area of the area from the opening end to the end portion on the opposite side of the opening of the contact surface. As a modification of the first embodiment, as illustrated in FIGS. 11A to 11C, an inclined surface may be formed in at least a partial area of the contact surface 60. As illustrated in FIG. 11A, a partial area of the contact surface 60 need not be inclined. A central axis 84 may be inclined with respect to the length direction of the inner case 3. The central axis 84 may be a straight line passing through the center of gravity of the cross section of a main part of the space in which the adsorbent 4 is disposed. As illustrated in FIG. 11B, an inclined surface may be formed in an area shorter than the contact surface 60 in the length direction of the inner case 3. As illustrated in FIG. 11C, an inclined surface may be formed in an area longer than the contact surface 60 in the length direction of the inner case 3.

Figure 11D:
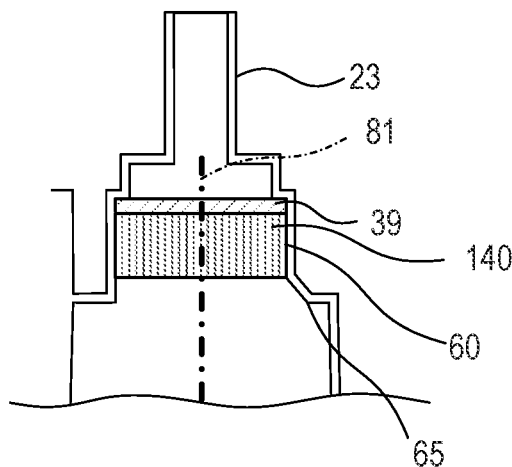
FIG. 11D is an enlarged view of a cross-sectional view of a canister according to a modification as viewed from the side, and is a view of the canister in which a partial area is not inclined in a portion between an opening into which an adsorbent is inserted and an end portion on an opening side of a contact surface.

As a modification of the second embodiment, as illustrated in FIG. 11D, an inclined surface only need be formed in at least a partial area of a portion between the opening 65 into which the adsorbent 140 is inserted and the end portion on the opening 65 side of the contact surface 60. A partial area of the portion between the opening 65 into which the adsorbent 140 is inserted and the end portion on the opening 65 side of the contact surface 60 need not be inclined.

(3e) In the above embodiments, the configuration in which the adsorbent 4 is an elastically deformable mass of activated carbon has been exemplified. However, the configuration of the adsorbent 4 is not limited thereto. For example, the adsorbent may be elastically undeformable or need not be activated carbon as long as no gap is generated between the adsorbent and the inner case 3. The adsorbent may have a honeycomb structure.

(3f) In the first embodiment, the configuration has been exemplified in which the outer case 2 is indirectly brought into contact with the adsorbent 4 to suppress the removal of the adsorbent 4 in the direction opposite to the direction in which the adsorbent 4 is inserted. However, the outer case 2 may be directly brought into contact with the adsorbent 4 to suppress the removal of the adsorbent 4 in the direction opposite to the direction in which the adsorbent 4 is inserted.

(3g) In the above embodiments, the configuration has been exemplified in which the charge port 21, the purge port 22, and the atmosphere port 23 are disposed on the same side of the case so as to face the same direction. However, the orientation of these ports is not limited thereto. For example, any one of the ports may be arranged in a direction orthogonal to the other ports. For example, any one of the ports may be disposed on the opposite side of the case from the other ports.

(3h) In the first embodiment, the configuration in which the inner case 3 has a round tubular shape and the cross-sectional shape of the inner case 3 is circular has been exemplified. Furthermore, the adsorbent 4 is formed in a truncated cone shape. However, the shape of the inner case 3 is not limited thereto. In addition, the shape of the adsorbent 4 is not limited thereto. For example, the inner case may have a polygonal shape and the adsorbent may be a pyramid or truncated pyramid.

In the second embodiment, the configuration in which the straight pipe portion 72 has a circular cross section has been exemplified. However, the shape of the straight pipe portion 72 is not limited thereto. For example, the straight pipe portion may have a polygonal shape.

(3i) One or a plurality of functions of one component in the above embodiments may be distributed as a plurality of components, or one or a plurality of functions of a plurality of components may be integrated into one component. A part of the configurations of the above embodiments may be omitted. At least a part of the configurations of the above embodiments may be added to or replaced with another configuration of the above embodiments.

What is claimed is:

1. A canister,
the canister being configured to adsorb and desorb evaporative fuel generated in a fuel tank of a vehicle, the canister comprising:
an adsorbent configured to adsorb the evaporative fuel, the adsorbent being formed into one mass; and
a tubular body that has a tubular shape and holds the adsorbent in a state where the adsorbent is inserted into the tubular body,
wherein
a contact surface that is at least a partial area of an inner wall surface of the tubular body in a length direction of a central axis is brought into contact with a side surface of the inserted adsorbent to suppress movement of the adsorbent in a direction orthogonal to the central axis, and
the tubular body has an inclined surface in which an inner wall surface is inclined in a direction approaching the central axis of the tubular body in at least a partial area of an area from a starting point to the contact surface, the starting point being an opening end of an opening into which the adsorbent is insertable.

2. The canister according to claim 1, wherein
the inclined surface is formed in at least a partial area of the contact surface, and forms a cross-sectional area in the direction orthogonal to the central axis, the cross-sectional area decreasing from an opening side of the contact surface toward an opposite side of the opening in the length direction of the central axis of the contact surface.

3. The canister according to claim 1, wherein
the inclined surface is formed in at least a partial area between the opening and an end portion on the opening side of the contact surface, and forms a cross-sectional area in the direction orthogonal to the central axis, the cross-sectional area decreasing from the opening side toward the end portion on the opening side of the contact surface.

4. The canister according to claim 1, further comprising a filter that closes the opening, wherein
a welded portion where a wall surface forming the opening and the filter are welded is provided.

5. The canister according to claim 1, further comprising an outer shell member that houses the tubular body.

6. The canister according to claim 5, wherein
the outer shell member is directly or indirectly brought into contact with the adsorbent to suppress removal of the adsorbent in a direction opposite to a direction in which the adsorbent is inserted.

7. The canister according to claim 1, wherein
the adsorbent is an elastically deformable mass of activated carbon.

* * * * *